United States Patent Office 3,488,185
Patented Jan. 6, 1970

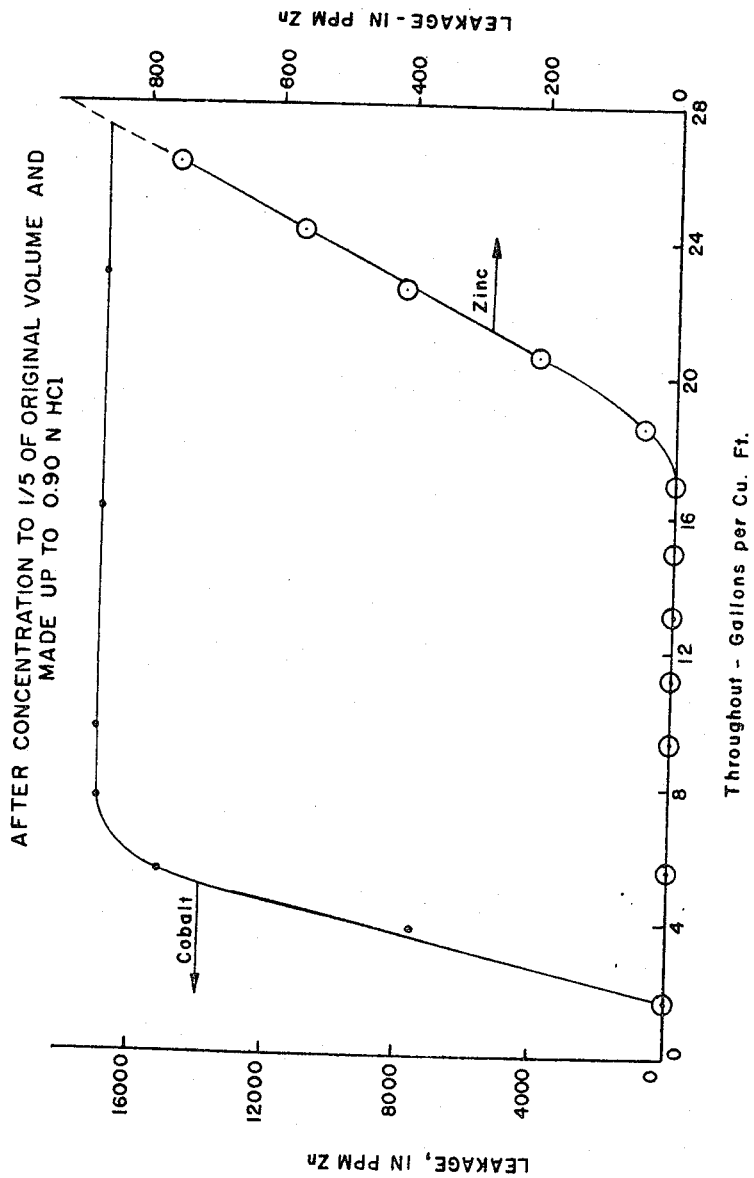

3,488,185
SEPARATION AND RECOVERY OF ZINC FROM SOLUTIONS CONTAINING ZINC IONS AND OTHER METAL IONS
Alfred W. Oberhofer, Alsip, Ill., assignor to Nalco Chemical Company, Chicago, Ill., a corporation of Delaware
Filed June 2, 1967, Ser. No. 643,137
Int. Cl. C22b *19/22;* C01g *9/04*
U.S. Cl. 75—120                3 Claims

ABSTRACT OF THE DISCLOSURE

A method of separating zinc from metals such as cobalt, copper, iron, vanadium, antimony, and zirconium. As an example, zinc and cobalt are catalyst components used in an oxo-alkylation process. In the process, cobalt and zinc catalysts are separated by converting zinc contained in a process stream to a complex anionic halide which is selectively sorbed on a strong base anion exchange resin. The process stream is first boiled in the presence of a strong mineral acid to effect evaporation of water. The complex anionic halide is then formed without difficulty by the addition of a halogen to the process stream.

---

The present invention relates to a novel method of separating zinc from solutions containing cobalt, copper, iron, vanadium, antimony, or zirconium. The invention finds particular use in separating zinc from solutions containing cobalt that are formed in an oxo-alkylation process.

In the oxo synthesis a catalytic addition of carbon monoxide-hydrogen mixtures to olefins takes place at elevated temperatures and pressures. Aldehydes and/or alcohols are produced having one more carbon atom than the corresponding olefin. Cobalt containing compounds, and in particular cobalt carbonyl compounds, are generally used as catalysts in the process. Zinc also is frequently used as a catalyst component or is present in the catalysts system. In view of the value of the cobalt and zinc catalysts it is necessary to recover these materials if the process is to be carried out on a substantial scale. While various methods have been proposed for recovering cobalt and/or zinc, these methods have not been entirely successful.

In a copending application of mine, U. S. Application Ser. No. 633,153 filed Apr. 24, 1967, a method is disclosed for separating zinc from cobalt-containing solutions in which both HCl and HF are used as zinc complexing agents. While that process works very effectively, it requires the presence of HF to assure success.

It is an object of the present invention to provide an improved technique for selectively removing zinc from a solution containing zinc and certain other metals.

It is another object of the present invention to provide an improved technique for selectively removing zinc from a solution containing both zinc and cobalt.

Another object of the invention is to provide a method for selectively removing zinc from a solution containing zinc and cobalt wherein only one halogen-containing compound need be employed.

A further object of the invention is to provide a less expensive method of separating zinc from a waste solution produced in an oxo-alkylation process.

Other objects will become apparent to those skilled in the art from the following detailed description of the invention.

In general, the present invention comprises the discovery that ion exchange materials can be used to advantage to separate zinc from solutions containing the zinc ion as well as one or more of the following ions: $Co^{++}$, $Cu^{++}$, $Fe^{+++}$, $Zr^{++++}$, and $V^{+++++}$. The invention is particularly useful in removing zinc from a waste solution produced in an oxo-alkylation process. Specifically, it has been found that zinc can be separated from cobalt or the other ions with great success by complexing zinc with a halogen compound if the solution is first boiled in the presence of a mineral acid. Boiling the solution in the presence of the acid removes a large portion of substances present in the solution which interfere with the formation of the zinc complex. Because these interfering substances have been removed, HCl alone, for example, is capable of forming a complex, which complex can be sorbed on a strong base anion exchange resin.

It has been found that a waste stream produced in the oxo-alkylation process contains several materials which interfere with the ability of zinc to form a complex with halides. The materials which appear to cause the interference include formic scid, carbonyls, hydrocarbonyls, and formaldehyde.

The following example taken in connection with the attached drawing serves to illustrate the present invention.

EXAMPLE

This example shows the separation of zinc from cobalt in a waste solution produced during the oxo-alkylation process. The cobalt, zinc, and iron content of the stream and its pH were as follows:

Stream B:
  Co in p.p.m. _____ 3,480
  Zn in p.p.m. _____ 2,800
  Fe in p.p.m. _____  210
  pH _____   3.70

In the process HCl was added to process stream B to obtain a 0.72 N HCl solution. The amount of acid added to the solution was 228 ml. of HCl (specific gravity 1.19) per gallon of solution. A 5 liter portion of process stream B was then concentrated to 1 liter by boiling the solution. The boiling temperature was 208° F. at the beginning and was slowly increased to 211° F. for approximately 90% of the evaporation. In the boiling step the solution was first boiled in beakers on a hot plate to a volume of approximately 2 liters. A gluey, yellow substance was formed which adhered to the glass walls. When the solution was transferred to other beakers it was noted that the gluey, yellow substance was completely soluble in 6 N HCl. The beakers were then cleaned with HCl and the solute was added to the rest of the product. The total HCl in the solution was found to be 0.90 normal which was determined at the end of the evaporation by analysis for free $H^+$ ions.

The concentrated solution containing 0.90 N HCl was then passed through a 100 ml. bed of Dowex SBR–Cl (a strong base anion exchange resin) in a ½ inch I.D. tube of 30 inch bed height at a flow rate of 0.5 g.p.m./cu. ft. The effluent was collected in 25 ml. fractions and analyzed. The results obtained are shown in the graph set out in the drawing.

As is apparent from the graph, the evaporation treatment causes a complete separation of zinc (as zero leakage) and a capacity of somewhat less than 2.0 lbs. of zinc per cu. ft. of resin. The zinc can be eluted from the anion exchange resin by regeneration with D.I. water or with acidified water.

The present invention has several advantages. First of all, it is possible to use a single halogen compound in the process. Inasmuch as HCl is less expensive than HF, a saving is effected in this process over a process using both HCl and HF a complexing agents. Furthermore, the evaporation step lessens the amount of complexing agent required in the process. A further advantage of the process lies in the fact that valuable materials such as formic acid can be recovered from the waste stream.

In the process a strong base anion exchange resin is used to selectively sorb a zinc complex. Any of the commercially available strong base resins containing a quaternary ammonium type of structure can be used in the process. Most of these materials contain one benzyl and three methyl groups on the nitrogen atom of the resin, although one or more of the methyl groups can be replaced by other groups such as an ethanol group. The quaternary ammonium anion exchange resins are highly ionized and can be used over a wide pH range.

When treating a waste stream from the oxo synthesis, the stream should be concentrated by from about 20 to 90%, and preferably from 60 to 85%, for best results. In this way substantially all of the interfering compounds such as formic acid, carbonyls, hydrocarbonyls, and formaldehyde can be removed.

Any mineral acid can be used in the process. These include sulfuric acid, hydrochloric acid, nitric acid, hydrobromic acid, hydroiodic acid, and hydrofluoric acid. The preferred acid is hydrochloric acid. The amount of acid added to the solution ordinarily will be enough to provide a normality of 0.3 to 3.0 N.

Obviously many modifications and variations of the invention as hereinbefore set forth may be made without departing from the spirit and scope thereof, and therefore only such limitations should be imposed as are indicated in the appended claims.

I claim:

1. A process for separating zinc from waste solutions containing zinc ions and cobalt ions, said solutions being produced in an oxo alkylation process which comprises: adding a mineral acid to said solution; boiling said solution in the presence of said mineral acid to remove from 20 to 90% of the solvent along with substances which interfere with the ability of zinc to form complexes with halides, said materials including formic acid, carbonyls, hydrocarbonyls, and formaldehyde; and thereafter passing the condensed solution through a strong base anion exchange resin, whereby a zinc complex is selectively sorbed on said strong base anion exchange resin.

2. A process as in claim 1 wherein the mineral acid is HCl and wherein the amount of HCl added to the solution is sufficient to provide a normality of from 0.3 to 3.0 N.

3. A process as in claim 1 wherein the mineral acid is HCl and wherein the amount of HCl added to the solution is sufficient to provide a normality of from 0.3 to 3.0 N.

References Cited

UNITED STATES PATENTS 2,962,351 11/1960 Stevenson _____ 23—97 XR
3,076,032 1/1963 Riemenschneider et al.
23—97 XR

OTHER REFERENCES

Article by R. M. Wheaton and W. C. Bauman, pp. 1088–1093; Ind. & Eng. Chem., vol. 43, No. 5 (May 1951).

Article by F. K. Lindsay and J. S. D'Amico, pp. 1085–1087; Ind. & Eng. Chem., vol. 43, No. 5 (May 1951).

"Ion Exchange Technology," Nachod & Scubert, 1956 ed., p. 412. Academic Press Inc., N.Y.

"Ion Exchange Separations in Analytical Chemisty" by Olaf Samuelson, 1963, ed., pp. 390, 391 and 395–398. John Wiley & Sons, N.Y.

EDWARD STERN, Primary Examiner

U.S. Cl. X.R.

23—50, 55, 97; 260—542